US008891598B1

(12) United States Patent
Wang et al.

(10) Patent No.: US 8,891,598 B1
(45) Date of Patent: Nov. 18, 2014

(54) TRANSMITTER AND RECEIVER CALIBRATION FOR OBTAINING THE CHANNEL RECIPROCITY FOR TIME DIVISION DUPLEX MIMO SYSTEMS

(71) Applicant: Magnolia Broadband Inc., Englewood, NJ (US)

(72) Inventors: Sherwin J. Wang, Towaco, NJ (US); Phil F. Chen, Denville, NJ (US); Haim Harel, New York, NY (US)

(73) Assignee: Magnolia Broadband Inc., Englewood, NJ (US)

( * ) Notice: Subject to any disclaimer, the term of this patent is extended or adjusted under 35 U.S.C. 154(b) by 0 days.

(21) Appl. No.: 14/109,904

(22) Filed: Dec. 17, 2013

Related U.S. Application Data

(60) Provisional application No. 61/906,157, filed on Nov. 19, 2013.

(51) Int. Cl.
*H04B 17/00* (2006.01)
(Continued)

(52) U.S. Cl.
CPC .............. *H04B 1/10* (2013.01); *H04B 17/0062* (2013.01); *H04L 25/0398* (2013.01); *H04B 7/08* (2013.01)
USPC ........... 375/220; 375/219; 375/221; 375/224; 455/69; 455/70; 455/68; 455/39; 370/252; 370/241

(58) Field of Classification Search
CPC .. H04L 25/0398; H04L 25/03; H04B 7/0626; H04B 7/0465; H04B 7/0643; H04B 7/0617; H04B 17/0062; H04B 17/0012; H04W 24/02; H04W 24/04; H04W 24/06; H04W 24/10; H01Q 3/267
USPC ........ 375/219, 221, 220, 224; 455/69, 70, 68, 455/39; 370/252, 241
See application file for complete search history.

(56) References Cited

U.S. PATENT DOCUMENTS

| 4,044,359 A | 8/1977 | Applebaum et al. |
| 4,079,318 A | 3/1978 | Kinoshita |

(Continued)

FOREIGN PATENT DOCUMENTS

| EP | 1 867 177 | 5/2010 |
| EP | 2 234 355 | 9/2010 |

(Continued)

OTHER PUBLICATIONS

Huang et al., "Antenna mismatch and calibration problem in coordinated multi-point transmission system," IET Communications, 2012, vol. 6, Issue 3, pp. 289-299.*

(Continued)

*Primary Examiner* — Chieh M Fan
*Assistant Examiner* — Michelle M Koeth
(74) *Attorney, Agent, or Firm* — Pearl Cohen Zedek Latzer Baratz LLP

(57) ABSTRACT

A communication device operating in time division duplex (TDD) mode using multiple antennas is provided herein. The communication device uses receive channel estimation measurements to perform transmit beamforming and multiple input multiple output (MIMO) transmission, based on self-calibration of the various up/down paths via a method of transmission and reception between its own antennas, thus achieving reciprocity mapping between up and down links. Either user equipment (UE) or a base station may routinely perform this self-calibration to obtain the most current correction factor for the channel reciprocity to reflect the most current operating conditions present during TDD MIMO operation.

12 Claims, 6 Drawing Sheets

(51) Int. Cl.
*H04W 24/02* (2009.01)
*H04B 1/10* (2006.01)
*H04B 7/08* (2006.01)
H04B 7/12 (2006.01)
H04B 1/76 (2006.01)
G01S 7/40 (2006.01)
H04J 1/16 (2006.01)
H04L 25/03 (2006.01)

(56) References Cited

U.S. PATENT DOCUMENTS

| | | | |
|---|---|---|---|
| 4,359,738 A | 11/1982 | Lewis | |
| 4,540,985 A | 9/1985 | Clancy et al. | |
| 4,628,320 A | 12/1986 | Downie | |
| 5,162,805 A | 11/1992 | Cantrell | |
| 5,363,104 A | 11/1994 | Richmond | |
| 5,444,762 A | 8/1995 | Frey et al. | |
| 5,732,075 A | 3/1998 | Tangemann et al. | |
| 5,915,215 A | 6/1999 | Williams et al. | |
| 5,936,577 A | 8/1999 | Shoki et al. | |
| 5,940,033 A | 8/1999 | Locher et al. | |
| 6,018,317 A | 1/2000 | Dogan et al. | |
| 6,046,655 A | 4/2000 | Cipolla | |
| 6,101,399 A | 8/2000 | Raleigh et al. | |
| 6,163,695 A | 12/2000 | Takemura | |
| 6,167,286 A | 12/2000 | Ward et al. | |
| 6,215,812 B1 | 4/2001 | Young et al. | |
| 6,226,507 B1 | 5/2001 | Ramesh et al. | |
| 6,230,123 B1 | 5/2001 | Mekuria et al. | |
| 6,259,683 B1 | 7/2001 | Sekine et al. | |
| 6,297,772 B1 | 10/2001 | Lewis | |
| 6,321,077 B1 | 11/2001 | Saitoh et al. | |
| 6,335,953 B1 | 1/2002 | Sanderford, Jr. et al. | |
| 6,370,378 B1 | 4/2002 | Yahagi | |
| 6,377,783 B1 | 4/2002 | Lo et al. | |
| 6,393,282 B1 | 5/2002 | Iimori | |
| 6,584,115 B1 | 6/2003 | Suzuki | |
| 6,697,622 B1 | 2/2004 | Ishikawa et al. | |
| 6,697,633 B1 | 2/2004 | Dogan et al. | |
| 6,834,073 B1 * | 12/2004 | Miller et al. | 375/130 |
| 6,842,460 B1 | 1/2005 | Olkkonen et al. | |
| 6,927,646 B2 | 8/2005 | Niemi | |
| 6,975,582 B1 | 12/2005 | Karabinis et al. | |
| 6,987,958 B1 | 1/2006 | Lo et al. | |
| 7,068,628 B2 | 6/2006 | Li et al. | |
| 7,177,663 B2 | 2/2007 | Axness et al. | |
| 7,190,964 B2 | 3/2007 | Damnjanovic et al. | |
| 7,257,425 B2 | 8/2007 | Wang et al. | |
| 7,299,072 B2 | 11/2007 | Ninomiya | |
| 7,392,015 B1 * | 6/2008 | Farlow et al. | 455/67.11 |
| 7,474,676 B2 | 1/2009 | Tao et al. | |
| 7,499,109 B2 | 3/2009 | Kim et al. | |
| 7,606,528 B2 | 10/2009 | Mesecher | |
| 7,719,993 B2 * | 5/2010 | Li et al. | 370/252 |
| 7,742,000 B2 | 6/2010 | Mohamadi | |
| 7,769,107 B2 | 8/2010 | Sandhu et al. | |
| 7,898,478 B2 | 3/2011 | Niu et al. | |
| 7,970,366 B2 | 6/2011 | Arita et al. | |
| 8,078,109 B1 | 12/2011 | Mulcay | |
| 8,115,679 B2 | 2/2012 | Falk | |
| 8,155,613 B2 | 4/2012 | Kent et al. | |
| 8,280,443 B2 | 10/2012 | Tao et al. | |
| 8,294,625 B2 | 10/2012 | Kittinger et al. | |
| 8,306,012 B2 | 11/2012 | Lindoff et al. | |
| 8,315,671 B2 | 11/2012 | Kuwahara et al. | |
| 8,369,436 B2 | 2/2013 | Stirling-Gallacher | |
| 8,509,190 B2 | 8/2013 | Rofougaran | |
| 8,520,657 B2 | 8/2013 | Rofougaran | |
| 8,526,886 B2 | 9/2013 | Wu et al. | |
| 8,588,844 B2 | 11/2013 | Shpak | |
| 8,599,955 B1 | 12/2013 | Kludt et al. | |
| 8,599,979 B2 | 12/2013 | Farag et al. | |
| 8,649,458 B2 | 2/2014 | Kludt et al. | |
| 8,666,319 B2 | 3/2014 | Kloper et al. | |
| 8,744,511 B2 | 6/2014 | Jones, IV et al. | |
| 2001/0029326 A1 | 10/2001 | Diab et al. | |
| 2001/0038665 A1 | 11/2001 | Baltersee et al. | |
| 2002/0024975 A1 | 2/2002 | Hendler | |
| 2002/0051430 A1 | 5/2002 | Kasami et al. | |
| 2002/0065107 A1 | 5/2002 | Harel et al. | |
| 2002/0085643 A1 | 7/2002 | Kitchener et al. | |
| 2002/0107013 A1 | 8/2002 | Fitzgerald | |
| 2002/0115474 A1 | 8/2002 | Yoshino et al. | |
| 2002/0181426 A1 | 12/2002 | Sherman | |
| 2002/0181437 A1 | 12/2002 | Ohkubo et al. | |
| 2003/0114162 A1 | 6/2003 | Chheda et al. | |
| 2003/0153322 A1 | 8/2003 | Burke et al. | |
| 2003/0153360 A1 | 8/2003 | Burke et al. | |
| 2003/0186653 A1 | 10/2003 | Mohebbi et al. | |
| 2003/0203717 A1 | 10/2003 | Chuprun et al. | |
| 2004/0056795 A1 | 3/2004 | Ericson et al. | |
| 2004/0063455 A1 | 4/2004 | Eran et al. | |
| 2004/0081144 A1 | 4/2004 | Martin et al. | |
| 2004/0121810 A1 | 6/2004 | Goransson et al. | |
| 2004/0125899 A1 | 7/2004 | Li et al. | |
| 2004/0125900 A1 | 7/2004 | Liu et al. | |
| 2004/0142696 A1 | 7/2004 | Saunders et al. | |
| 2004/0147266 A1 | 7/2004 | Hwang et al. | |
| 2004/0156399 A1 | 8/2004 | Eran | |
| 2004/0166902 A1 | 8/2004 | Castellano et al. | |
| 2004/0198292 A1 | 10/2004 | Smith et al. | |
| 2004/0228388 A1 | 11/2004 | Salmenkaita | |
| 2004/0235527 A1 | 11/2004 | Reudink et al. | |
| 2004/0264504 A1 | 12/2004 | Jin | |
| 2005/0068230 A1 | 3/2005 | Munoz et al. | |
| 2005/0068918 A1 | 3/2005 | Mantravadi et al. | |
| 2005/0075140 A1 | 4/2005 | Famolari | |
| 2005/0129155 A1 | 6/2005 | Hoshino | |
| 2005/0147023 A1 | 7/2005 | Stephens et al. | |
| 2005/0163097 A1 | 7/2005 | Do et al. | |
| 2005/0245224 A1 | 11/2005 | Kurioka | |
| 2005/0250544 A1 | 11/2005 | Grant et al. | |
| 2005/0287962 A1 | 12/2005 | Mehta et al. | |
| 2006/0041676 A1 | 2/2006 | Sherman | |
| 2006/0092889 A1 | 5/2006 | Lyons et al. | |
| 2006/0094372 A1 | 5/2006 | Ahn et al. | |
| 2006/0111149 A1 | 5/2006 | Chitrapu et al. | |
| 2006/0135097 A1 | 6/2006 | Wang et al. | |
| 2006/0183503 A1 | 8/2006 | Goldberg | |
| 2006/0203850 A1 | 9/2006 | Johnson et al. | |
| 2006/0227854 A1 | 10/2006 | McCloud et al. | |
| 2006/0264184 A1 | 11/2006 | Li et al. | |
| 2006/0270343 A1 | 11/2006 | Cha et al. | |
| 2006/0271969 A1 | 11/2006 | Takizawa et al. | |
| 2006/0285507 A1 | 12/2006 | Kinder et al. | |
| 2007/0041398 A1 | 2/2007 | Benveniste | |
| 2007/0058581 A1 | 3/2007 | Benveniste | |
| 2007/0076675 A1 | 4/2007 | Chen | |
| 2007/0093261 A1 | 4/2007 | Hou et al. | |
| 2007/0097918 A1 | 5/2007 | Cai et al. | |
| 2007/0115914 A1 | 5/2007 | Ohkubo et al. | |
| 2007/0152903 A1 * | 7/2007 | Lin et al. | 343/795 |
| 2007/0223380 A1 | 9/2007 | Gilbert et al. | |
| 2008/0043867 A1 | 2/2008 | Blanz et al. | |
| 2008/0051037 A1 | 2/2008 | Molnar et al. | |
| 2008/0144737 A1 | 6/2008 | Naguib | |
| 2008/0165732 A1 | 7/2008 | Kim et al. | |
| 2008/0238808 A1 | 10/2008 | Arita et al. | |
| 2008/0240314 A1 | 10/2008 | Gaal et al. | |
| 2008/0280571 A1 | 11/2008 | Rofougaran et al. | |
| 2008/0285637 A1 * | 11/2008 | Liu et al. | 375/224 |
| 2009/0003299 A1 | 1/2009 | Cave et al. | |
| 2009/0028225 A1 | 1/2009 | Runyon et al. | |
| 2009/0046638 A1 | 2/2009 | Rappaport et al. | |
| 2009/0058724 A1 | 3/2009 | Xia et al. | |
| 2009/0121935 A1 | 5/2009 | Xia et al. | |
| 2009/0137206 A1 | 5/2009 | Sherman et al. | |
| 2009/0154419 A1 | 6/2009 | Yoshida et al. | |
| 2009/0190541 A1 | 7/2009 | Abedi | |
| 2009/0227255 A1 | 9/2009 | Thakare | |
| 2009/0239486 A1 | 9/2009 | Sugar et al. | |
| 2009/0268616 A1 | 10/2009 | Hosomi | |
| 2009/0285331 A1 | 11/2009 | Sugar et al. | |

(56) References Cited

U.S. PATENT DOCUMENTS

| | | |
|---|---|---|
| 2009/0322610 A1 | 12/2009 | Hants et al. |
| 2009/0322613 A1 | 12/2009 | Bala et al. |
| 2010/0002656 A1 | 1/2010 | Ji et al. |
| 2010/0037111 A1 | 2/2010 | Ziaja et al. |
| 2010/0040369 A1 | 2/2010 | Zhao et al. |
| 2010/0067473 A1 | 3/2010 | Cave et al. |
| 2010/0111039 A1 | 5/2010 | Kim et al. |
| 2010/0117890 A1 | 5/2010 | Vook et al. |
| 2010/0135420 A1 | 6/2010 | Xu et al. |
| 2010/0150013 A1* | 6/2010 | Hara et al. ............ 370/252 |
| 2010/0172429 A1 | 7/2010 | Nagahama et al. |
| 2010/0195560 A1 | 8/2010 | Nozaki et al. |
| 2010/0222011 A1 | 9/2010 | Behzad |
| 2010/0234071 A1 | 9/2010 | Shabtay et al. |
| 2010/0278063 A1 | 11/2010 | Kim et al. |
| 2010/0283692 A1 | 11/2010 | Achour et al. |
| 2010/0285752 A1 | 11/2010 | Lakshmanan et al. |
| 2010/0291931 A1 | 11/2010 | Suemitsu et al. |
| 2010/0303170 A1 | 12/2010 | Zhu et al. |
| 2010/0316043 A1 | 12/2010 | Doi et al. |
| 2011/0019639 A1 | 1/2011 | Karaoguz et al. |
| 2011/0032849 A1 | 2/2011 | Yeung et al. |
| 2011/0032972 A1 | 2/2011 | Wang et al. |
| 2011/0085532 A1 | 4/2011 | Scherzer et al. |
| 2011/0105036 A1 | 5/2011 | Rao et al. |
| 2011/0116489 A1 | 5/2011 | Grandhi |
| 2011/0134816 A1 | 6/2011 | Liu et al. |
| 2011/0150050 A1 | 6/2011 | Trigui et al. |
| 2011/0150066 A1 | 6/2011 | Fujimoto |
| 2011/0151826 A1 | 6/2011 | Miller et al. |
| 2011/0163913 A1 | 7/2011 | Cohen et al. |
| 2011/0205883 A1 | 8/2011 | Mihota |
| 2011/0205998 A1 | 8/2011 | Hart et al. |
| 2011/0228742 A1 | 9/2011 | Honkasalo et al. |
| 2011/0249576 A1 | 10/2011 | Chrisikos et al. |
| 2011/0273977 A1 | 11/2011 | Shapira et al. |
| 2011/0281541 A1 | 11/2011 | Borremans |
| 2011/0299437 A1 | 12/2011 | Mikhemar et al. |
| 2012/0014377 A1 | 1/2012 | Joergensen et al. |
| 2012/0015603 A1 | 1/2012 | Proctor et al. |
| 2012/0020396 A1 | 1/2012 | Hohne et al. |
| 2012/0028671 A1 | 2/2012 | Niu et al. |
| 2012/0033761 A1 | 2/2012 | Guo et al. |
| 2012/0034952 A1 | 2/2012 | Lo et al. |
| 2012/0045003 A1 | 2/2012 | Li et al. |
| 2012/0064838 A1 | 3/2012 | Miao et al. |
| 2012/0076028 A1 | 3/2012 | Ko et al. |
| 2012/0076229 A1 | 3/2012 | Brobston et al. |
| 2012/0115523 A1 | 5/2012 | Shpak |
| 2012/0170672 A1 | 7/2012 | Sondur |
| 2012/0201153 A1 | 8/2012 | Bharadia et al. |
| 2012/0201173 A1 | 8/2012 | Jain et al. |
| 2012/0207256 A1 | 8/2012 | Farag et al. |
| 2012/0212372 A1 | 8/2012 | Petersson et al. |
| 2012/0218962 A1 | 8/2012 | Kishiyama et al. |
| 2012/0220331 A1* | 8/2012 | Luo et al. ............ 455/517 |
| 2012/0230380 A1 | 9/2012 | Keusgen et al. |
| 2012/0251031 A1 | 10/2012 | Suarez et al. |
| 2012/0270531 A1 | 10/2012 | Wright et al. |
| 2012/0270544 A1 | 10/2012 | Shah |
| 2012/0314570 A1 | 12/2012 | Forenza et al. |
| 2012/0321015 A1 | 12/2012 | Hansen et al. |
| 2013/0010623 A1 | 1/2013 | Golitschek |
| 2013/0017794 A1 | 1/2013 | Kloper et al. |
| 2013/0023225 A1 | 1/2013 | Weber |
| 2013/0051283 A1 | 2/2013 | Lee et al. |
| 2013/0070741 A1 | 3/2013 | Li et al. |
| 2013/0079048 A1 | 3/2013 | Cai et al. |
| 2013/0094437 A1 | 4/2013 | Bhattacharya |
| 2013/0094621 A1 | 4/2013 | Luo et al. |
| 2013/0095780 A1 | 4/2013 | Prazan et al. |
| 2013/0101073 A1 | 4/2013 | Zai et al. |
| 2013/0156120 A1 | 6/2013 | Josiam et al. |
| 2013/0170388 A1 | 7/2013 | Ito et al. |
| 2013/0208587 A1 | 8/2013 | Bala et al. |
| 2013/0208619 A1 | 8/2013 | Kudo et al. |
| 2013/0223400 A1 | 8/2013 | Seo et al. |
| 2013/0229996 A1 | 9/2013 | Wang et al. |
| 2013/0235720 A1 | 9/2013 | Wang et al. |
| 2013/0242899 A1 | 9/2013 | Lysejko et al. |
| 2013/0242976 A1 | 9/2013 | Katayama et al. |
| 2013/0272437 A1 | 10/2013 | Eidson et al. |
| 2013/0301551 A1 | 11/2013 | Ghosh et al. |
| 2013/0331136 A1 | 12/2013 | Yang et al. |
| 2013/0343369 A1 | 12/2013 | Yamaura |
| 2014/0010089 A1 | 1/2014 | Cai et al. |
| 2014/0071873 A1 | 3/2014 | Wang et al. |
| 2014/0086077 A1 | 3/2014 | Safavi |
| 2014/0086081 A1 | 3/2014 | Mack et al. |
| 2014/0098681 A1 | 4/2014 | Stager et al. |
| 2014/0185535 A1 | 7/2014 | Park et al. |
| 2014/0192820 A1 | 7/2014 | Azizi et al. |

FOREIGN PATENT DOCUMENTS

| | | | |
|---|---|---|---|
| JP | 2009-278444 | 11/2009 | |
| JP | 2009278444 A * | 11/2009 | ............ H03F 1/32 |
| WO | WO 03/047033 | 6/2003 | |
| WO | WO 03/073645 | 9/2003 | |
| WO | WO 2010/085854 | 8/2010 | |
| WO | WO 2011/060058 | 5/2011 | |

OTHER PUBLICATIONS

Office Action for U.S. Appl. No. 13/630,146 dated Jan. 22, 2013.
Office Action for U.S. Appl. No. 13/630,146 dated Mar. 27, 2013.
Office Action for U.S. Appl. No. 13/762,159 dated Apr. 16, 2013.
Office Action for U.S. Appl. No. 13/762,191 dated May 2, 2013.
Office Action for U.S. Appl. No. 13/762,188 dated May 15, 2013.
Office Action for U.S. Appl. No. 13/776,204 dated May 21, 2013.
Office Action for U.S. Appl. No. 13/770,255 dated Jun. 6, 2013.
Office Action for U.S. Appl. No. 13/776,068 dated Jun. 11, 2013.
Notice of Allowance for U.S. Appl. No. 13/762,159 dated Jun. 20, 2013.
Office Action for U.S. Appl. No. 13/775,886 dated Jul. 17, 2013.
Notice of Allowance for U.S. Appl. No. 13/762,191 dated Jul. 19, 2013.
Notice of Allowance for U.S. Appl. No. 13/630,146 dated Jul. 31, 2013.
Notice of Allowance for U.S. Appl. No. 13/762,188 dated Aug. 19, 2013.
Notice of Allowance for U.S. Appl. No. 13/770,255 dated Sep. 17, 2013.
Ahmadi-Shokouh et al., "Pre-LNA Smart Soft Antenna Selection for MIMO Spatial Multiplexing/Diversity System when Amplifier/Sky Noise Dominates", European Transactions on Telecommunications, Wiley & Sons, Chichester, GB, vol. 21, No. 7, Nov. 1, 2010, pp. 663-677.
Office Action for U.S. Appl. No. 13/889,150 dated Sep. 25, 2013.
Office Action for U.S. Appl. No. 13/955,320 dated Oct. 15, 2013.
Office Action for U.S. Appl. No. 13/776,204 dated Oct. 23, 2013.
Office Action for U.S. Appl. No. 13/925,454 dated Oct. 28, 2013.
Office Action for U.S. Appl. No. 13/955,194 dated Oct. 30, 2013.
Office Action for U.S. Appl. No. 14/013,190 dated Nov. 5, 2013.
Office Action for U.S. Appl. No. 13/776,068 dated Nov. 5, 2013.
Office Action for U.S. Appl. No. 14/010,771 dated Dec. 17, 2013.
Office Action for U.S. Appl. No. 14/065,182 dated Dec. 17, 2013.
Office Action for U.S. Appl. No. 14/068,863 dated Dec. 17, 2013.
Office Action for U.S. Appl. No. 14/011,521 dated Dec. 23, 2013.
Office Action for U.S. Appl. No. 13/775,886 dated Jan. 7, 2014.
Office Action for U.S. Appl. No. 14/018,965 dated Jan. 13, 2014.
Office Action for U.S. Appl. No. 13/858,302 dated Jan. 16, 2014.
Office Action for U.S. Appl. No. 14/042,020 dated Jan. 16, 2014.
Office Action for U.S. Appl. No. 14/102,539 dated Jan. 27, 2014.
Office Action for U.S. Appl. No. 14/087,376 dated Jan. 29, 2014.
Notice of Allowance for U.S. Appl. No. 13/776,204 dated Jan. 31, 2014.
Office Action for U.S. Appl. No. 14/094,644 dated Feb. 6, 2014.
Notice of Allowance for U.S. Appl. No. 13/955,320 dated Feb. 21, 2014.

(56) References Cited

OTHER PUBLICATIONS

Office Action for U.S. Appl. No. 14/109,904 dated Feb. 27, 2014.
Office Action for U.S. Appl. No. 13/925,454 dated Mar. 7, 2014.
Notice of Allowance for U.S. Appl. No. 14/172,500 dated Mar. 26, 2014.
Notice of Allowance for U.S. Appl. No. 14/065,182 dated Mar. 25, 2014.
Notice of Allowance for U.S. Appl. No. 14/068,863 dated Mar. 25, 2014.
Office Action for U.S. Appl. No. 14/010,771 dated Apr. 4, 2014.
Office Action for U.S. Appl. No. 14/085,352 dated Apr. 7, 2014.
Office Action for U.S. Appl. No. 13/889,150 dated Apr. 9, 2014.
Notice of Allowance for U.S. Appl. No. 13/955,194 dated Apr. 9, 2014.
Office Action for U.S. Appl. No. 14/097,765 dated Apr. 22, 2014.
Notice of Allowance for U.S. Appl. No. 14/087,376 dated May 9, 2014.
Office Action for U.S. Appl. No. 14/143,580 dated May 9, 2014.
Notice of Allowance for U.S. Appl. No. 13/776,068 dated May 13, 2014.
Office Action for U.S. Appl. No. 14/013,190 dated May 20, 2014.
Zetterberg, "Experimental Investigation of TDD Reciprocity-Based Zero-Forcing Transmit Precoding", Hindawi Publishing Corporation, EURASIP Journal on Advances in Signal Processing, (2011), vol. 2011, Article ID 137541, pp. 1-10.
Office Action issued by the United States Patent and Trademark Office for U.S. Appl. No. 14/011,521 dated Jul. 1, 2014.
Notice of Allowance issued by the United States Patent and Trademark Office for U.S. Appl. No. 13/889,150 dated Jul. 8, 2014.
Office Action issued by the United States Patent and Trademark Office for U.S. Appl. No. 14/250,767 dated Jul. 10, 2014.
Notice of Allowance issued by the United States Patent and Trademark Office for U.S. Appl. No. 14/085,352 dated Jul. 23, 2014.
Notice of Allowance issued by the United States Patent and Trademark Office for U.S. Appl. No. 14/013,190 dated Jul. 25, 2014.
Office Action issued by the United States Patent and Trademark Office for U.S. Appl. No. 14/198,280 dated Jul. 29, 2014.
Office Action issued by the United States Patent and Trademark Office for U.S. Appl. No. 14/042,020 dated Jul. 31, 2014.
Notice of Allowance issued by the United States Patent and Trademark Office for U.S. Appl. No. 14/010,771 dated Aug. 6, 2014.
Office Action issued by the United States Patent and Trademark Office for U.S. Appl. No. 14/306,458 dated Aug. 13, 2014.
Office Action issued by the United States Patent and Trademark Office for U.S. Appl. No. 14/297,898 dated Aug. 15, 2014.
Notice of Allowance issued by the United States Patent and Trademark Office for U.S. Appl. No. 14/085,252 dated Aug. 27, 2014.
Office Action issued by the United States Patent and Trademark Office for U.S. Appl. No. 14/181,844 dated Aug. 29, 2014.
Office Action issued by the United States Patent and Trademark Office for U.S. Appl. No. 14/296,209 dated Sep. 4, 2014.
Notice of Allowance issued by the United States Patent and Trademark Office for U.S. Appl. No. 14/097,765 dated Sep. 8, 2014.
Notice of Allowance issued by the United States Patent and Trademark Office for U.S. Appl. No. 14/143,580 dated Sep. 8, 2014.
Office Action issued by the United States Patent and Trademark Office for U.S. Appl. No. 14/198,155 dated Sep. 12, 2014.

\* cited by examiner

TRANSMITTER AND RECEIVER CALIBRATION FOR OBTAINING THE CHANNEL RECIPROCITY FOR TIME DIVISION DUPLEX MIMO SYSTEMS

CROSS REFERENCE TO RELATED APPLICATIONS

This application claims the benefit of U.S. Provisional Patent Application No. 61/906,157, filed on Nov. 19, 2013, which is incorporated in its entirety herein by reference.

FIELD OF THE INVENTION

The present invention relates to the transmitter and receiver calibration to obtain the channel reciprocity for multiple-input-multiple-output (MIMO) systems as well as for SISO and MISO systems, in which the transmit and receive operate in the same spectrum (for example, TDD, WiFi,) so that the feedback of channel state information can be reduced or eliminated for the MIMO operation. Here "time division duplex" (TDD) for the wireless communication systems is referred to in general for systems using the same frequency spectrum for methods of communications in a time division manner.

BACKGROUND OF THE INVENTION

Prior to setting forth a short discussion of the related art, it may be helpful to set forth definitions of certain terms that will be used hereinafter.

The term "MIMO" as used herein, is defined as the use of multiple antennas at both the transmitter and receiver to improve communication performance. MIMO offers significant increases in data throughput and link range without additional bandwidth or increased transmit power. It achieves this goal by spreading the transmit power over the antennas to achieve spatial multiplexing that improves the spectral efficiency (more bits per second per Hz of bandwidth) or to achieve a diversity gain that improves the link reliability (reduced fading), or increased antenna directivity.

The term "TDD" (Time Division Duplex) as used herein, is defined as the use of the same or a single channel (e.g., the same or overlapping frequency spectrum) for both downlink and uplink transmissions. For example, TDD communication, e.g., between a mobile device and a base station, may periodically alternate between uplink transmissions (e.g. from the mobile device to a base station for a predetermined uplink interval or period, such as, 5 milliseconds (ms)) and downlink transmissions (e.g. from a base station to a mobile device or UE for a predetermined downlink period, such as, 5 ms). The base station typically coordinates the alternating timing between uplink (UL) and downlink (DL) transmissions.

The term "beamforming" sometimes referred to as "spatial filtering" as used herein, is a signal processing technique used in antenna arrays for directional signal transmission or reception. This is achieved by combining elements in the array in such a way that signals at particular angles experience constructive interference while others experience destructive interference. Beamforming can be used at both the transmitting and receiving ends in order to achieve spatial selectivity.

The term "beamformer" as used herein refers to RF circuitry that implements beamforming and usually includes a combiner and may further include switches, controllable phase shifters, and in some cases amplifiers and/or attenuators.

A transmitter in a MIMO system requires channel state information (CSI) so that a set of precoded weights can be set to the multiple data streams of the transmitter, in order to exploit the channels for the multiple spatial channel transmission. Typically, the receiver can feed the CSI or even the preferred pre-coding matrix (index) back to the transmitter. These feedbacks can consume some available bandwidth of the transmission in the opposite direction and reduce the data throughput. If transmission in both directions operate in the same spectrum, like in the case of time division duplex (TDD) systems, the channels through the air are reversible and the channel information can be estimated by the receive device and then applied to the transmit device.

However, a complete transmission channel should be from the transmitter baseband to the receiver baseband, which includes various components inside the transmitter (e.g., DAC, up converter, power amplifier, filter) and receiver (e.g., duplexer, LNA, down converter, filter, ADC). The transmission path and receive path may thus experience very different gain/loss and delays behavior, due to the different components used in both paths. Channel reciprocity without considering the different delay and gain/loss factors between the transmit/receive paths are therefore not valid and may not be accurate enough for the use by devices in TDD MIMO systems. These parameters can also be factory calibrated. One important element that jeopardizes reciprocity is antennas, which project slightly different radiation patterns at Up and Down Links, due to differences in the Voltage Standing Wave Ratio (VSWR) in both directions. Antenna VSWR cannot be practically calibrated in the factory, due to the cost of such procedures.

In beamforming applications there are benefits in using uplink signals' channel estimation for downlink beamforming, i.e. for establishment of calculated reciprocity A method and apparatus for self-calibration of the transmitter and receiver paths is disclosed herein (between base band and transmit/receive antennas) of a MIMO device to obtain the precise channel reciprocity information necessary for improving the (TDD) MIMO systems.

SUMMARY OF THE INVENTION

There is now provided according to embodiments of the invention a calibration method to improve TDD MIMO system for effectively overcoming the aforementioned difficulties inherent in the art.

According to an embodiment of the invention, communication devices are provided in a MIMO system. The communication device may be static such as a base station, or may be mobile such as user equipment (UE). The communication device may include a plurality of M antennas for TDD MIMO operation. Each antenna may be used for both transmit and receive paths. The communication device may include switches to provide extra paths in the receiving path of each radio. One of the multiple receiving paths will be implemented via the path used for the regular operation. Another receiving path may consist of an attenuator to provide an additional path loss (for example, 20 dB) so that the Low Noise Amplifier (LNA) will not be saturated by the strong calibration signal during the calibration process.

According to some embodiments of the present invention, the communication device may perform the following self-calibration processes to obtain the correction factor for the channel reciprocity information. A communication device may transmit the calibration signals from one antenna/radio while itself measures the calibration signals through another antenna/radio under three calibration configuration setups:

(A) the calibration signals are transmitted in high power mode (at maximum output power allowed), the receive path should include an attenuator (e.g., 20 dB attenuation) in front of the LNA to safe guard the LNA, (B) the calibration signal is transmitted in lower power mode (e.g., digitally attenuated by 20 dB), the receive path includes the extra attenuation (such as, in a non-limiting example, 20 dB), and (C) the calibration signal is transmitted in lower power mode while the receive path is through the path used in the normal operation mode. The received calibration signals in these three calibration setups can then derive the correction factor between these two antennas to account for the channel reciprocity information. This calibration process may be repeated for all the antennas to be used in MIMO transmit and receive. Both transmit and receive radio paths of each antenna should be calibrated at least once. For example, we may pair each of the M-1 antennas with the first antenna for two calibrations (one transmit, one receive). With (2M-2) calibrations, we may get all the correction factors for the devices consisting of M antennas/radios.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be more fully understood by reference to the following detailed description when read with the accompanying drawings in which:

Figure 1:
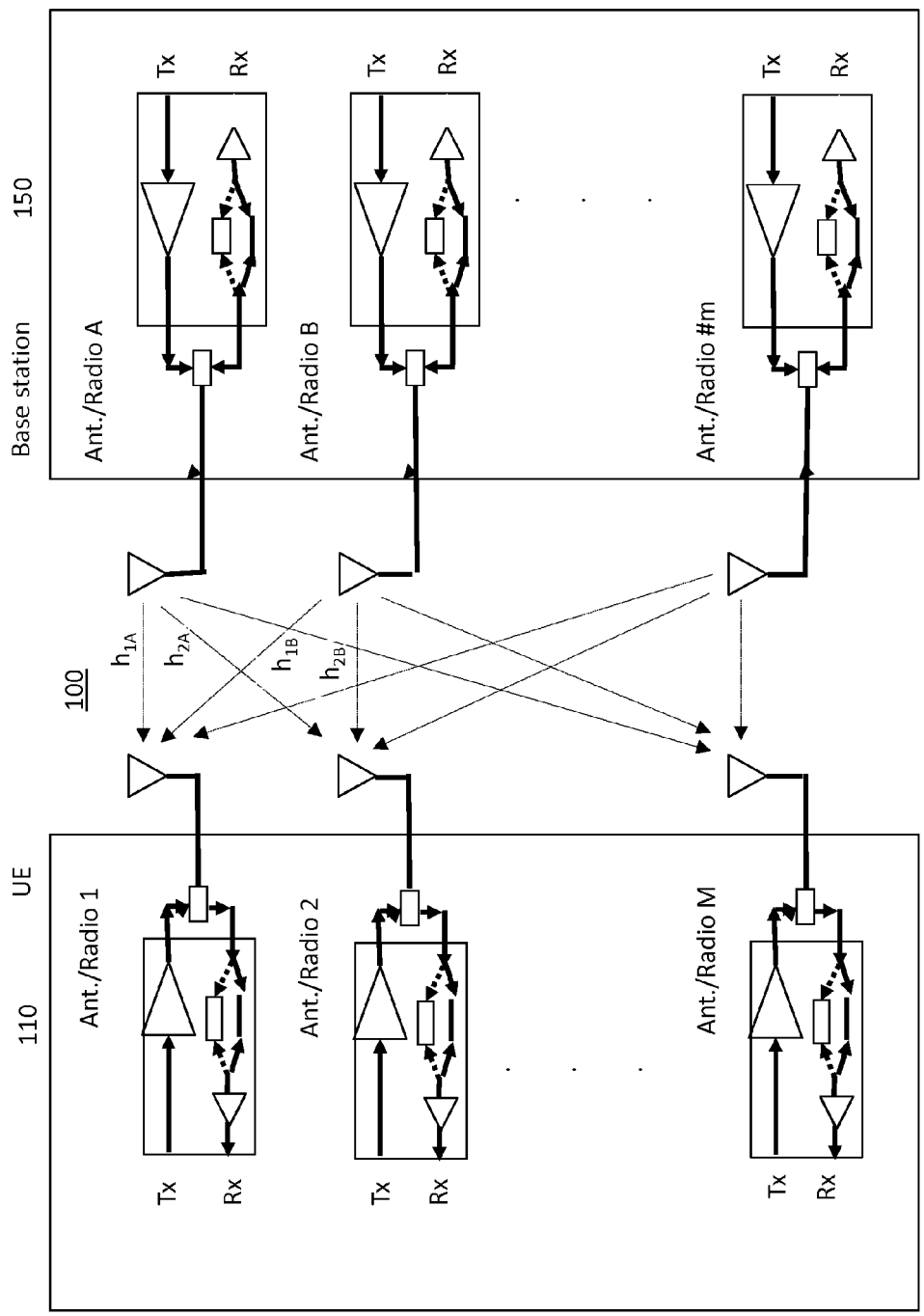
FIG. 1 is a schematic illustration of channel description for a TDD MIMO system according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention propose the calibration configurations and procedures to derive the correction factors on channel reciprocity information to make this information useful for improving the spectral efficiency in TDD MIMO systems.

According to some embodiments of the present invention, a communication device having a receive path is provided. The communication device may include a number M antennas and respective radio modules. The communication device may further include a processor operable in a baseband domain and configured to perform a self-calibration procedure by which a correction factor may be computed for a channel reciprocity level, determined by said self-calibration procedure. The communication device may further include a plurality of switches in each one of said radio modules configured to change the receive path for regular multiple-input multiple-output (MIMO) operation or during the aforementioned calibration procedure. The communication device may further include a digital attenuator configured to adjust calibration signals in the baseband domain, wherein the communication device may be operative in a time division duplex (TDD) MIMO system.

According to some embodiments of the present invention, the communication device may further include an antenna set in that may be configured to alternate transmitting and receiving periods on a single channel according to a TDD communication protocol, wherein the aforementioned antenna set may be used for defining the phases employed in MIMO transitions and selected using information measured at the device during receiving periods based on channel reciprocity.

According to some embodiments of the present invention, the communication device may further include means for supporting N×N MIMO transmissions and receptions, such that M≥N.

According to some embodiments of the present invention, the communication device may further include multiple receive paths and a plurality of switches contained in the device, wherein some path losses included in the receive path between the receive antenna and a low noise amplifier (LNA); and switches which may change the receive paths used during regular MIMO operation and during calibration.

According to some embodiments of the present invention, the communication device may further include processor or other baseband logic for digitally attenuating the calibration signal by an amount that is sufficient to prevent the LNA in the path undergoing calibration from saturating.

According to some embodiments of the present invention, the communication device may further include a processor or other baseband logic performing the self-calibration procedure, in order to adjust for the differences in the transmit path and receive path for all the antenna/radios used in MIMO operation, wherein the correction factors are expressed by $p_{ij}$, which is the ratio of the differences between the transmit and receive paths contained in the antenna/radio j and antenna/radio i for channel reciprocity.

According to some embodiments of the present invention, the communication device may be further configured to perform the following self-calibration procedure in which one antenna/radio (i) acts as a transmitter and the other antenna/radio (j) acts as the receiver during the calibration procedure: performing the following for each two antennas/radios (i and j): selecting using a processor or other baseband logic two antennas/radios (i and j) for the following 3-step self-calibration procedure; emitting a calibration signal with the signal strength equivalent to the signal strength used during regular MIMO operation, the receiver using one receive path with some path loss to prevent LNA from saturation and recording the received calibration signal $R_{a\_ji}$; transmitting a calibration signal that is digitally attenuated, the receiver continually employing the same receive path used in said emitting step and recording the received calibration signal $R_{b\_ji}$; transmitting a calibration signal that is digitally attenuated, the receiver switch selecting the receive path used for regular MIMO operation and recording the received calibration signal $R_{c\_ij}$; and reversing the roles of transmitter and receiver for the two selected antennas/radios to repeat said self-calibration procedure and recording the three measured calibrated signals $R_{a\_ij}$, $R_{b\_ij}$, and $R_{c\_ij}$.

According to some embodiments of the present invention, the communication device may further include be operable to compute the correction factor on channel reciprocity by: performing the following for a calibrated antenna/radio and un-calibrated antenna/radio pair: selecting using a processor or other baseband logic a calibrated and un-calibrated pair to perform the 3-step calibration procedure after completing the calibration for the first pair; and repeating the calibration process until all the antennas/radios to be used for MIMO operations are all calibrated.

According to some embodiments of the present invention, the communication device may be further operable to compute the correction factor on channel reciprocity by: using the processor or other baseband logic to determine the correction factor on channel reciprocity obtained with the calibration data for antenna/radio elements i and j, wherein said correction factor is expressed by $\rho_{ij}=(R_{a\_ji}*R_{c\_ji}*R_{b\_ij})/(R_{b\_ji}*R_{a\_ij}*R_{c\_ij})$.

According to some embodiments of the present invention, the communication device may further include: a timer; and said timer operable to be preset using said processor or other baseband logic to repeat the 3-step calibration procedure for all the antennas/radios to be used for MIMO operation by re-computing and updating the correction factors for channel reciprocity.

According to some embodiments of the present invention, the communication device may be further operable to re-compute said correction factors for channel reciprocity based on the threshold of a changing condition by: presetting said processor or other baseband logic to re-compute and update the correction factors for channel reciprocity when said threshold is met; and repeating the 3-step calibration procedure for all the antennas/radios to be used for MIMO operation.

Figure 2:
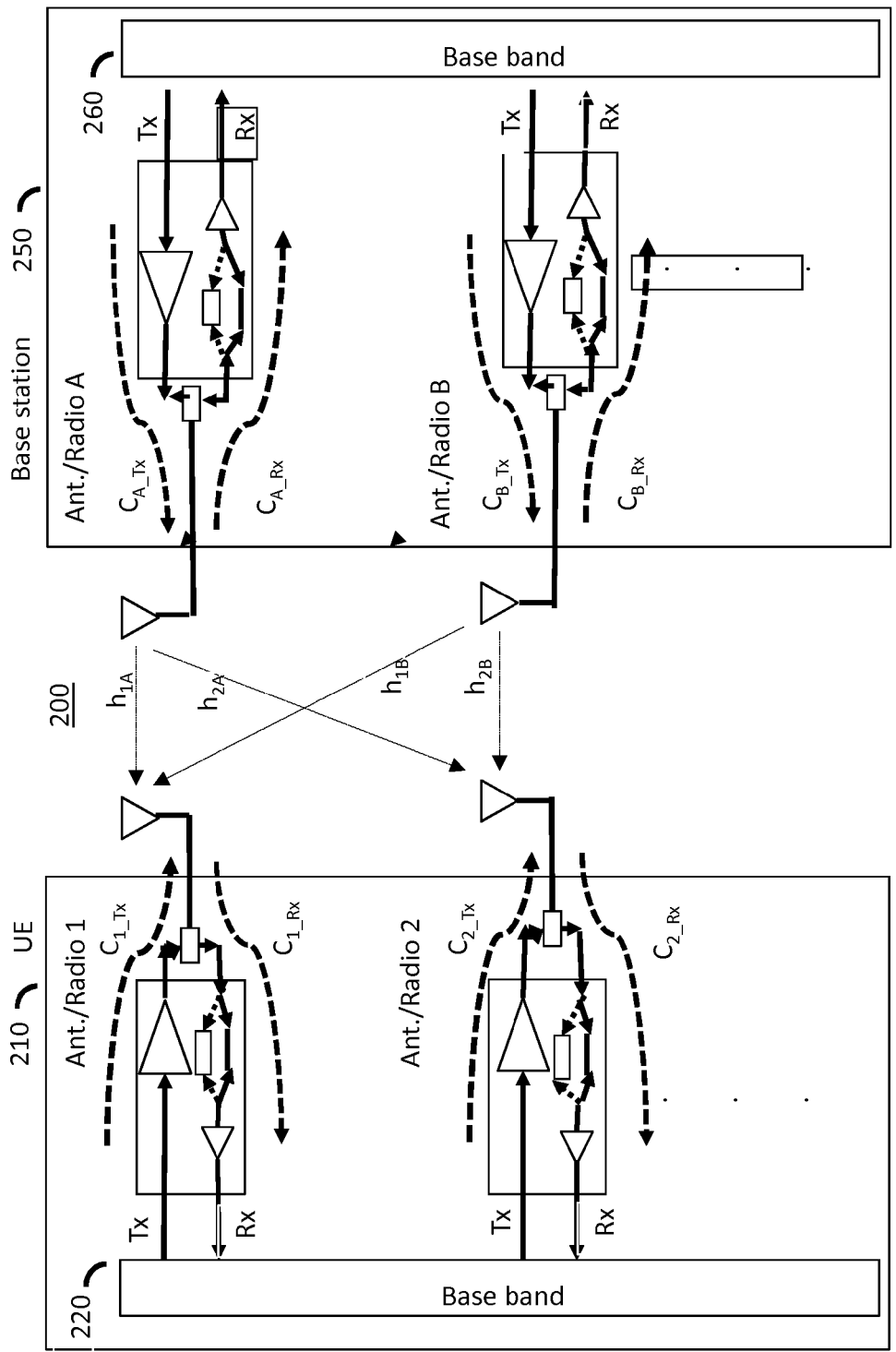
FIG. 2 is a schematic illustration of effective channel including the transmit and receive paths for channel reciprocity according to some embodiments of the present invention.

FIG. 1 illustrates a TDD MIMO system. Element 110 shows that the UE has M antennas and radios. Element 150 illustrates that the base station may also have M antennas and radios as well. Each antenna on these two devices may be used for both transmit and receive, but not simultaneously, in the TDD MIMO operation. The channels available over the air (between the antennas) are reversible, i.e., $h_{1A}=h_{A1}$, $h_{2A}=h_{A2}$, $h_{1B}=h_{B1}$, . . . , $h_{1M}=h_{M1}$. However, The MIMO signals are processed in the base band shown in elements 220 and 260 contained in FIG. 2. Hence, the effective channels considered for reciprocity should include the transmit path and the receive path of both communication devices (e.g., both base station and UE). As shown in FIG. 2, the effective channels $\tilde{h}_{1A}$, $\tilde{h}_{2A}$, $\tilde{h}_{1B}$, and $\tilde{h}_{2B}$, can then be expressed by the following equations:

$$\tilde{h}_{1A}=C_{A\_Tx}*h_{1A}*C_{1\_Rx} \quad (1)$$

$$\tilde{h}_{2A}=C_{A\_Tx}*h_{2A}*C_{2\_Rx} \quad (2)$$

$$\tilde{h}_{1B}=C_{B\_Tx}*h_{1B}*C_{1\_Rx} \quad (3)$$

$$\tilde{h}_{2B}=C_{B\_Tx}*h_{2B}*C_{2\_Rx} \quad (4)$$

where $C_A$ and $C_B$ are the gains/loss of the transmitters, and $C_1$ and $C_2$ are the gains/loss of the receivers.

In the exemplary TDD MIMO system shown in FIG. 2, the UE may perform a self-calibration, according to the embodiments of the present invention, to obtain the correction factor for obtaining the valid uplink channel information ($\tilde{h}_{A1}$, $\tilde{h}_{A2}$, $\tilde{h}_{B1}$, and $\tilde{h}_{B2}$) from its estimated downlink receiving channels ($\tilde{h}_{1A}$, $\tilde{h}_{2A}$, $\tilde{h}_{1B}$, and $\tilde{h}_{2B}$), those may be used to calculate the pre-coding weights for the UE's MIMO transmission.

According to one embodiment of this invention, the base station may perform a self-calibration process, to obtain the correction factor for the channel reciprocity so that the base station may apply the channel reciprocity to obtain the down link channel information from the estimated channels.

According to another embodiment of this invention, the self-calibration of a communication device is performed to determine the difference between the transmit path and receive path of each radio. This calibration may be done using its own two antennas/radios, one for transmit and the other for receive. The calibration process may be repeated until both transmit and receive paths for all the antennas/radios are calibrated. The calibration is done for the regular operation condition (i.e., power amplifiers operating in high power mode, and by low noise amplifiers in the receive paths that are not saturated.). The high power PA transmission may saturate the receiving LNA during the calibration since the transmit antenna/radio and the receive antenna/radio may be next to each other (i.e. in the same communication device). The extra attenuation path may be provided in the receive path to prevent the LNA from saturation during the calibration. The calibration process may be separated into three steps with three different calibration configurations (modes) to get rid of the impact of the extra attenuations/paths effects on the calibration.

Figure 3:
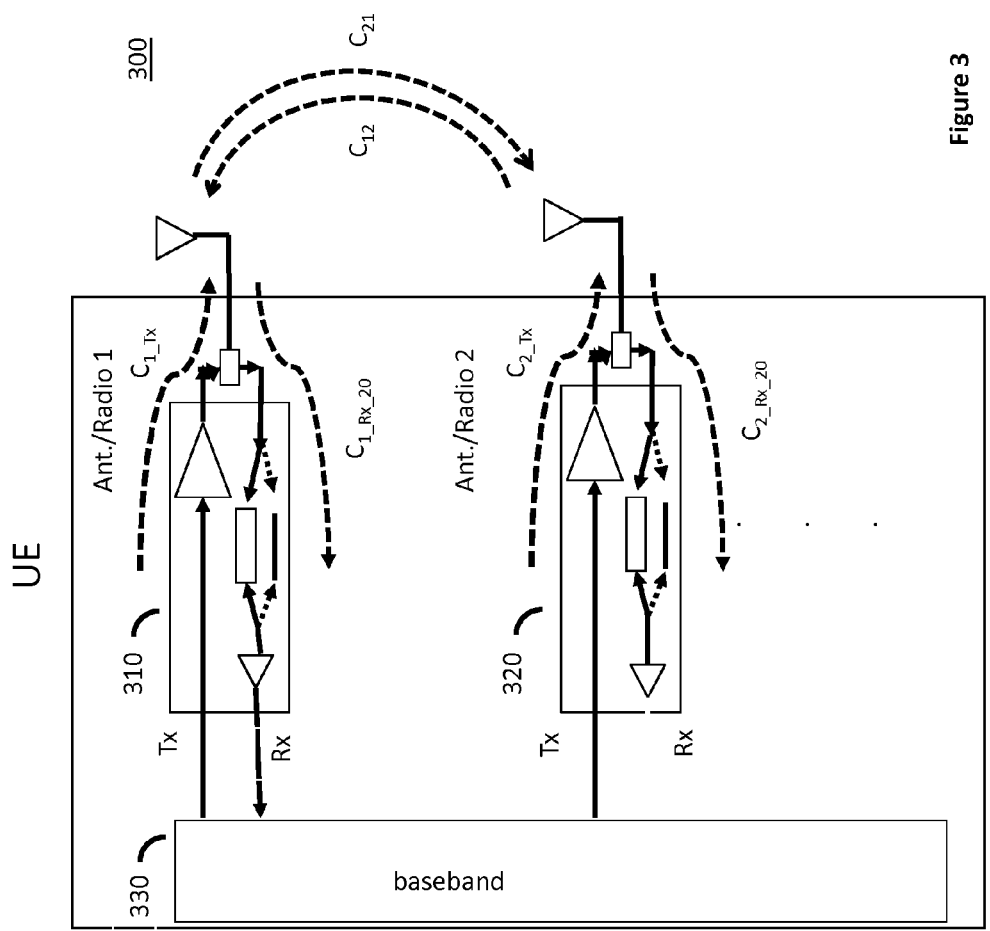
FIG. 3 depicts an exemplary UE self-calibration configuration for Step (a) according to some embodiments of the present invention.

FIG. 3 shows the configuration setup for the first step (a) of the calibration. The calibration signal $S_c$, is output from baseband element 330, and is transmitted from the first antenna/radio 310 with the nominal maximum power allowed in the regular operation. The calibration signal may be received, through antenna coupling $C_{21}$, by the second antenna/radio 320. For Step (a) calibration, an extra attenuation (e.g., 20 dB) may be set in the receive path to prevent the LNA from saturating. The received calibration signal $R_{a\_21}$ at the base band can then be expressed by:

$$R_{a\_21}=S_c*C_{1\_Tx}*C_{21}*C_{2\_Rx\_20} \quad (5)$$

wherein $C_{1\_Tx}$ is the gain/loss of the transmit path between the baseband and the first antenna when the power amplifier operates in high-power mode, $C_{21}$ is the antenna coupling from transmit antenna (1) to receive antenna (2), and $C_{2\_Rx\_20}$ is the gain/loss of the receive path between the second antenna and the baseband including the additional attenuation.

Here the extra attenuation of 20 dB is assumed during the Step (a) calibration. Note that the power amplifiers in MIMO transmission usually operate at high gain mode to support the high data rate communications.

Figure 4:
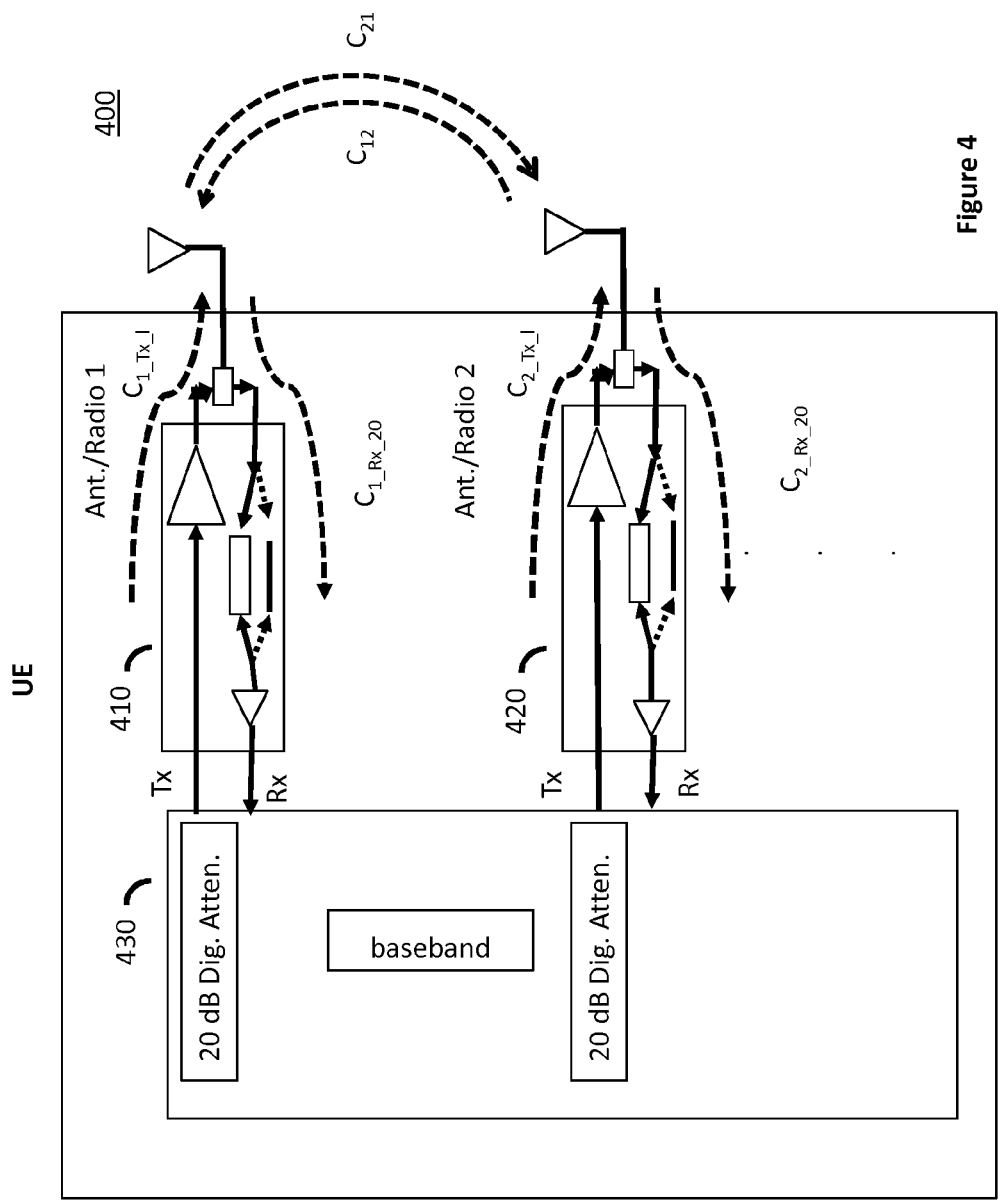
FIG. 4 illustrates an exemplary UE self-calibration configuration for Step (b) according to some embodiments of the present invention.

400 (FIG. 4) shows the configuration setup for the second step (b) of the calibration. The calibration signal $S_c$, digitally attenuated by 20 dB and output from baseband 430, is transmitted from the first antenna/radio 410. The calibration signal may be received, through antenna coupling $C_{21}$, by the second antenna/radio 420. For Step (b) calibration, an extra attenuation (e.g., 20 dB) may be kept in the receive path. The received calibration signal $R_{b\_21}$ at the base band can then be expressed by:

$$R_{b\_21} = S_c * C_{1\_Tx\_1} * C_{21} * C_{2\_Rx\_20}/10 \quad (6)$$

Wherein $C_{1\_Tx\_1}$ is the gain/loss of the transmit path between the baseband and the first antenna when the power amplifier operates in low-power mode. It should be noted that the division by 10 on the right hand side of Equation (6) indicates the calibration signal $S_c$ power being digitally attenuated by 20 dB.

Figure 5:
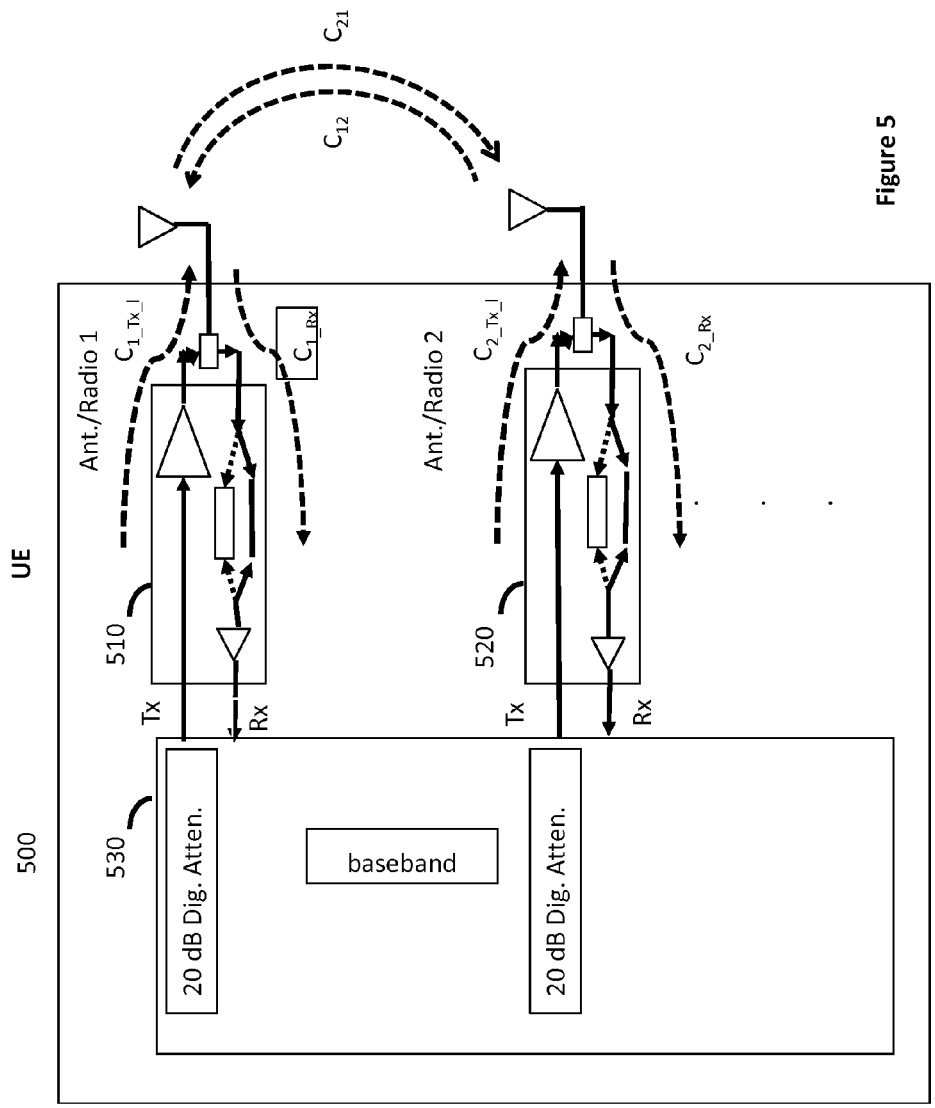
FIG. 5 shows an exemplary UE self-calibration configuration for Step (c) according to some embodiments of the present invention.

FIG. 5 shows the configuration setup for the third step (c) of the calibration. The calibration signal $S_c$, is digitally attenuated by 20 dB and output from baseband element 530, and is transmitted from the first antenna/radio 510. The calibration signal may be received, through antenna coupling $C_{21}$, by the second antenna/radio 520. For step (c) calibration, the receive path is kept under the regular operation condition without the extra attenuation. The received calibration signal $R_{c\_21}$ at the baseband can then be expressed by:

$$R_{c\_21} = S_c * C_{1\_Tx\_1} * C_{21} * C_{2\_Rx}/10 \quad (7)$$

Where $C_{2\_Rx}$ is the gain/loss of the receive path between the second antenna and the baseband under regular operation (i.e., excluding the extra attenuation).

Equation (5), (6), and (7) consist of the information of the transmit path of the first antenna/radio, $C_{1\_Tx}$, and the receive path of the second antenna/radio, $C_{2\_Rx}$, that are needed for deriving the correction factors on the channel reciprocity. The 3-step calibration may be repeated with the reverse of calibration signal transmission, i.e., the calibration signal is transmitted from the second antenna/radio and received by the first antenna/radio. The latter calibration will obtain the information of the receive path of the first antenna/radio, $C_{1\_Rx}$, and the transmit path of the second antenna/radio, $C_{2\_Tx}$, and can be expressed by the following equations, Eq. (8), (9) and (10):

$$R_{a\_12} = S_c * C_{2\_Tx} * C_{12} * C_{1\_Rx\_20} \quad (8)$$

$$R_{b\_12} = S_c * C_{2\_Tx\_1} * C_{12} * C_{1\_Rx\_20}/10 \quad (9)$$

$$R_{c\_12} = S_c * C_{2\_Tx\_1} * C_{12} * C_{1\_Rx}/10 \quad (10)$$

Wherein $C_{2\_Tx}$ is the gain/loss of the transmit path between the baseband and the second antenna for power amplifier operating at high gain mode (regular MIMO operation), $C_{2\_Tx\_1}$ is the gain/loss of the transmit path between the baseband and the second antenna when the power amplifier operates at low-power mode, $C_{1\_Rx\_20}$ is the gain/loss of the receive path between the second antenna and the baseband including the extra attenuation (e.g., 20 dB). $C_{1\_Rx}$ is the gain/loss of the receive path between the first antenna and the baseband under regular operation (i.e., excluding the extra attenuation).

In addition, the antenna coupling is reversible, i.e., $C_{21} = C_{12}$.

In the exemplary TDD 2×2 MIMO system, the UE may perform channel estimation and obtain the downlink channel information, $\tilde{h}_{1A}$, $\tilde{h}_{2A}$, $\tilde{h}_{1B}$, and $\tilde{h}_{2B}$, represented by Eq. (1), (2), (3), and (4), respectively. The UE may utilize the channel reciprocity to obtain the uplink MIMO transmission channels so that the UE can set up the pre-coding weights accordingly. The uplink MIMO channels, $\tilde{h}_{A1}$, $\tilde{h}_{A2}$, $\tilde{h}_{B1}$, and $\tilde{h}_{B2}$ can be expressed by the following equations Eq. (11), (12), (13), and (14):

$$\tilde{h}_{A1} = C_{1\_Tx} * h_{A1} * C_{A\_Rx} \quad (11)$$

$$\tilde{h}_{A2} = C_{2\_Tx} * h_{A2} * C_{A\_Rx} \quad (12)$$

$$\tilde{h}_{B1} = C_{1\_Tx} * h_{B1} * C_{B\_Rx} \quad (13)$$

$$\tilde{h}_{B2} = C_{2\_Tx} * h_{B2} * C_{B\_Rx} \quad (14)$$

Where $h_{A1}$, $h_{A2}$, $h_{B1}$, and $h_{B2}$ are the uplink MIMO channels from UE Tx antennas to the receive antennas of the base station. These over the air channels are reversible, i.e., $h_{1A} = h_{A1}$, $h_{2A} = h_{A2}$, $h_{1B} = h_{B1}$, and $h_{2B} = h_{B2}$.

On the uplink MIMO transmission, there is a correction factor between the Tx antennas of the UE, due to the difference between the Tx/Rx paths of the UE antennas/radios. These correction factors may be derived from the calibration. In the exemplary 2×2 MIMO configuration, the correction factor between the first and second Tx antenna may be explicitly obtained. Staring with Eq. (11) and (12), that represent the channels from the first and second Tx antennas of the UE to the receive antenna A at base station, this can be expressed by:

$$\tilde{h}_{A1}/\tilde{h}_{A2} = (C_{1\_Tx} * h_{A1})/(C_{2\_Tx} * h_{A2}) \quad (15)$$

Similarly, from Eq. (1) and (2), we may obtain:

$$\tilde{h}_{1A}/\tilde{h}_{2A} = (C_{1\_Rx} * h_{1A})/(C_{2\_Rx} * h_{2A}) \quad (16)$$

The on the air channels are reversible ($h_{A1} = h_{1A}$, $h_{A2} = h_{2A}$). From Eq. (15) and (16), the ratio of the uplink MIMO channels for the two transmit antennas may be represented in Eq. (17), $$\tilde{h}_{A1}/\tilde{h}_{A2} = (\tilde{h}_{1A}/\tilde{h}_{2A}) * (C_{1\_Tx} * C_{2\_Rx})/(C_{2\_Tx} * C_{1\_Rx}) = (\tilde{h}_{1A}/\tilde{h}_{2A}) * \rho_{12} \quad (17)$$

Note that $\tilde{h}_{1A}$ and $\tilde{h}_{2A}$ may be obtained from UE's channel estimation, and the correction factor $\rho_{12} = (C_{1\_Tx} * C_{2\_Rx})/(C_{2\_Tx} * C_{1\_Rx})$ in which $C_{1\_Tx}$, $C_{2\_Rx}$, $C_{2\_Tx}$, and $C_{1\_Rx}$ may be obtained from the invented 3-step calibrations. Similarly, using Eq. (3), (4), (13), and (14), the other two channels to the receive antennas B at the base station may be shown with the same correction factor, i.e.:

$$\tilde{h}_{B1}/\tilde{h}_{B2} = (\tilde{h}_{1B}/\tilde{h}_{2B}) * (C_{1\_Tx} * C_{2\_})/(C_{2\_Tx} * C_{1\_Rx}) = (\tilde{h}_{1B}/\tilde{h}_{2B}) * \rho_{12} \quad (18)$$

Equations (17) and (18) show that the uplink channel may be obtained from the downlink channel estimation and the correction factor, $\rho_{12}$, which is the weight (amplitude and phase) ratio of antenna 1 to antenna 2.

Furthermore, from Equation (5), (6), and (7), the following formula may be obtained:

$$C_{1\_Tx} * C_{2\_Rx} = (R_{a\_21} * R_{c\_21})/(R_{b\_21} * S_c * C_{21}) \quad (19)$$

Similarly, the following may be obtained from Eq. (8), (9), and (10):

$$C_{2\_Tx} * C_{1\_Rx} = (R_{a\_12} * R_{c\_12})/(R_{b\_12} * S_c * C_{12}) \quad (20)$$

Coupling between the antennas are reversible (i.e., $C_{21} = C_{12}$).

The correction factor for the channel reciprocity, $\rho_{12}$, may then be obtained from the 3-step self-calibration measurement, $$\rho_{12} = (R_{a\_21} * R_{c\_21} * R_{b\_12})/(R_{b\_21} * R_{c\_12} * R_{c\_12}) \quad (21)$$

Figure 6:
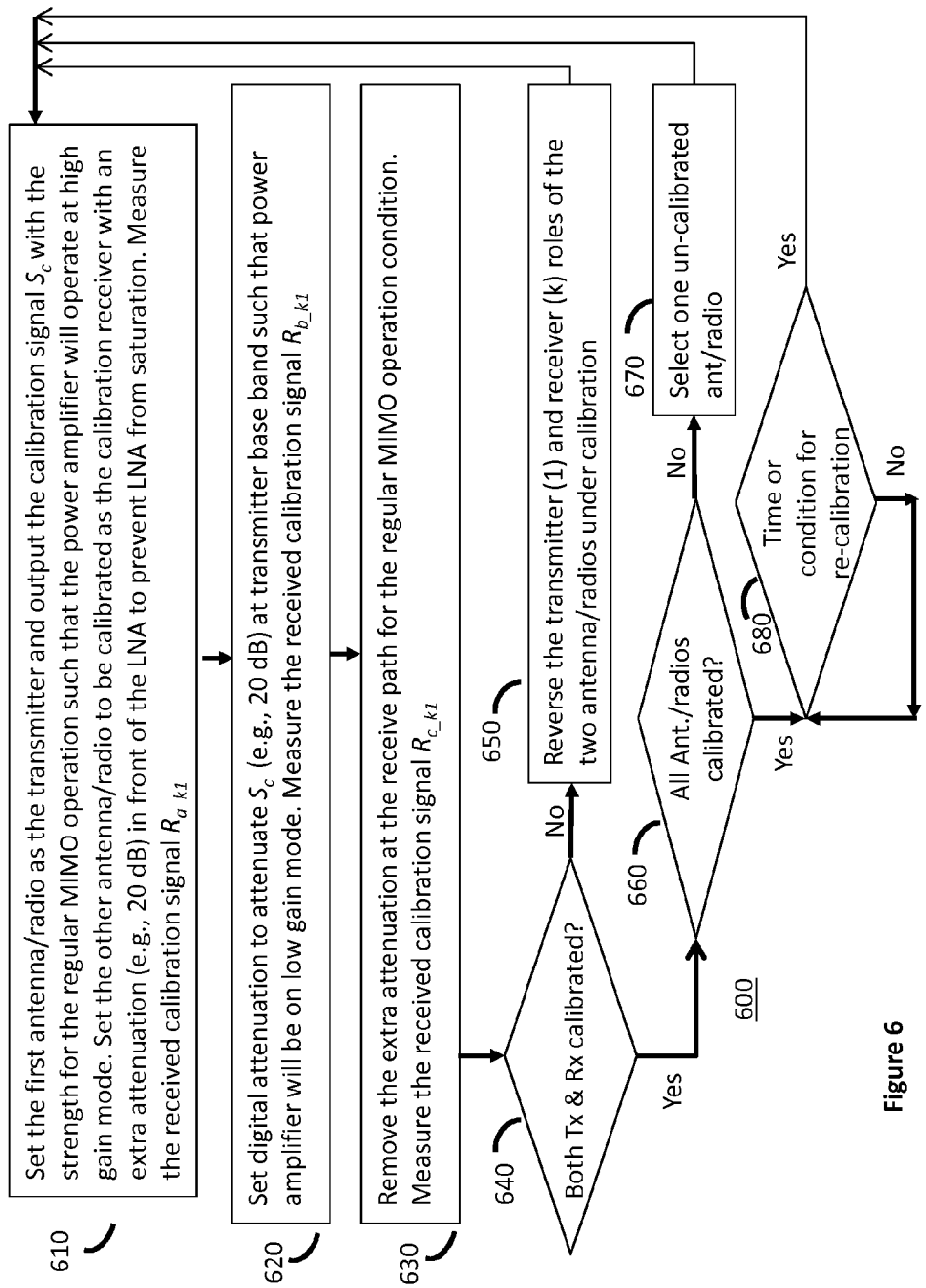
FIG. 6 describes the logic flow contained in the self-calibration procedure according to some embodiments of the present invention.

According to another embodiment of this invention a TDD communication device (either a UE or a base station) may routinely perform this self-calibration to obtain the most current correction factor for the channel reciprocity to reflect the most current operating conditions present during TDD MIMO operation. The components, like Power Amplifiers (PA), filters, etc. present in the device's Tx and Rx paths may vary with temperature or time (aging). Hence, routinely self-calibrating may update the correction factor for channel reciprocity. FIG. 6 outlines the steps used by the routine self-calibration procedure. Element 610 shows the first configuration and the first step (a) of the 3-step self-calibration. In this step, the calibration signal is set to the regular MIMO signal strength and drives the power amplifier at high power (gain) mode. The receive path includes an extra attenuation to prevent a low noise amplifier from saturating. The received calibration signal is recoded as $R_{a\_k1}$ (for Step a, Transmitter 1, Receiver k). Element 620 shows the second configuration and the second step (b) of the 3-step self-calibration procedure. On this step, the calibration signal is digitally attenuated (e.g., by 20 dB) and drives the power amplifier at low power (gain) mode. The receive path retains the extra attenuation. The received calibration signal is recoded as $R_{b\_k1}$. Element 630 shows the third configuration and the third step (c) of the 3-step self-calibration procedure. In this step, the calibration signal is digitally attenuated (e.g., by 20 dB) and drives the power amplifier at low power (gain) mode. The receive path does not consist of any extra attenuation and operates for regular MIMO operation. The received calibration signal is recoded as $R_{c\_k1}$. Element 640 checks to see if both Tx and Rx paths of the two ant./radios under calibration are calibrated. If not, element 650 shows the transmitter and receiver roles being reversed for the two antennas/radios under calibration and can then go to 610 to repeat the 3-step calibration. If both the Tx and Rx paths are calibrated, procedural step described by element 660 then checks if any other antenna/radio in the device is not calibrated. Element 670 selects one of the un-calibrated antenna/radio to pair with the first calibrated antenna/radio and will then go to procedural step 610 to start the 3-step calibration. If all the antennas/radios needed for MIMO operation in the device are calibrated, the self-calibration is complete. The correction factors for the channel reciprocity may be calculated and updated for future use when needed. Element 680 shows that a timer or that a threshold of a pre-defined condition (e.g., temperature) may be pre-set for repeating the self-calibration procedure to obtain an update on the correction factors.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention.

The invention claimed is:

1. A communication device having a receive path comprising:
   a number M antennas and respective radio modules, wherein the M antennas and respective radio modules support N×N multiple-input multiple-output (MIMO) transmissions and receptions, wherein M≥N;
   a processor operable in a baseband domain and configured to perform a self-calibration procedure by which a correction factor is computed for a channel reciprocity level, determined by said self-calibration procedure;
   a plurality of switches in each one of said radio modules configured to change the receive path for regular MIMO operation or during said self-calibration procedure;

a digital attenuator configured to adjust calibration signals in the baseband domain; and a low noise amplifier (LNA), wherein there are multiple receive paths and at least one path loss included in the receive path between one of the M antennas used for receiving and the LNA, wherein the M antennas are configured to alternate transmitting and receiving periods on a single channel according to a time division duplex (TDD) communication protocol, wherein the M antennas are configured to define phases employed in MIMO transmission and selected using information measured at the communication device during receiving periods based on the channel reciprocity level, wherein the digital attenuator is further configured to digitally attenuate the calibration signal by an amount that is sufficient to prevent the LNA in the path undergoing calibration from saturating, wherein the communication device is further operable to perform the self-calibration procedure in which one antenna/radio (i) acts as a transmitter and the other antenna/radio (j) acts as the receiver during the self-calibration procedure, the self-calibration procedure comprising:

performing the following for each of two antennas/radios (i and j):

emitting a first calibration signal with a signal strength equivalent to a signal strength used during regular MIMO operation, the receiver using one receive path with some path loss to prevent the LNA from saturation and recording a received calibration signal $R_{a\_ji}$;

transmitting a second calibration signal that is digitally attenuated, the receiver continually employing the same one receive path used in said emitting step and recording a received calibration signal $R_{b\_ji}$;

transmitting a third calibration signal that is digitally attenuated, the receiver switch selecting the receive path used for regular MIMO operation and recording a received calibration signal $R_{c\_ji}$; and reversing roles of transmitter and receiver for the two selected antennas/radios to repeat said self-calibration procedure and recording the measured calibrated signals: $R_{a\_ij}$, $R_{b\_ij}$, and $R_{c\_ij}$.

2. The communication device of claim 1, wherein the processor is configured to perform the self-calibration procedure, in order to adjust for the differences in the transmit path and receive path for all the antenna/radios used in MIMO operation, wherein the correction factor is expressed by $\rho_{ij}$, which is the weight ratio of antenna i to antenna j for the channel reciprocity level.

3. The communication device of claim 1, further operable to compute the correction factor for the channel reciprocity level by:

performing the following for a calibrated antenna/radio and un-calibrated antenna/radio pair:

selecting a calibrated and un-calibrated antenna/radio pair to perform the self-calibration procedure after completing the self-calibration for the first antenna/radio pair; and repeating the self-calibration procedure until all the antennas/radios to be used for MIMO operations are calibrated.

4. The communication device of claim 3, further operable to compute the correction factor for the channel reciprocity level by:

determining the correction factor for the channel reciprocity level obtained with calibration data for antenna/radio elements i and j, wherein said correction factor is expressed by $\rho_{ij}=(R_{a\_ji}*R_{c\_ji}*R_{b\_ij})/(R_{b\_ji}*R_{a\_ij}*R_{c\_ij})$.

5. The communication device of claim 1, further comprising: a timer operable to be preset using said processor to repeat the self-calibration procedure for all the antennas/radios used for MIMO operation by recomputing and updating the correction factors for the channel reciprocity level.

6. The communication device of claim 1, further operable to recompute said correction factor for the channel reciprocity level based on the threshold of a changing condition by:

presetting said processor or other baseband logic to recompute and update the correction factor for the channel reciprocity level when said threshold is met; and repeating the self-calibration procedure for all the antennas/radios to be used for MIMO operation.

7. A method comprising:

deploying a number M antennas and respective radio modules, wherein the M antennas and respective radio modules support N×N multiple-input multiple-output (MIMO) transmissions and receptions, wherein M≥N;

using a processor to perform a self-calibration procedure;

changing a receive path using a plurality of switches in each radio module for regular MIMO operation or during said self-calibration method;

adjusting calibration signals in the baseband domain using a digital attenuator, to compute a correction factor for a channel reciprocity level in a communication device;

alternatively transmitting and receiving with an antenna set for alternating periods on a single channel according to a TDD communication protocol;

defining phases employed in MIMO transmissions for selecting said antenna set based on information measured at the communication device during receiving periods based on channel reciprocity;

receiving on multiple receive paths and measuring at least one path loss included in one of the receive paths between one of the M antennas used for receiving and a low noise amplifier (LNA);

digitally attenuating the calibration signal by an amount that is sufficient to prevent the LNA in the path undergoing calibration from saturating; and performing the self-calibration procedure in which one antenna/radio (i) acts as a transmitter and the other antenna/radio (j) acts as the receiver during the self-calibration procedure, the self-calibration procedure comprising:

performing the following for each of two antennas/radios (i and j):

emitting a first calibration signal with a signal strength equivalent to a signal strength used during regular MIMO operation, the receiver using one receive path with some path loss to prevent the LNA from saturation and recording a received calibration signal $R_{a\_ji}$;

transmitting a second calibration signal that is digitally attenuated, the receiver continually employing the same one receive path used in said emitting step and recording a received calibration signal $R_{b\_ji}$;

transmitting a third calibration signal that is digitally attenuated, the receiver switch selecting the receive path used for regular MIMO operation and recording a received calibration signal $R_{c\_ji}$; and reversing roles of transmitter and receiver for the two selected antennas/radios to repeat said self-calibration procedure and recording the measured calibrated signals: $R_{a\_ij}$, $R_{b\_ij}$, and $R_{c\_ij}$.

8. The method of claim 7, further comprising: performing a self-calibration procedure with a processor or other baseband logic to adjust for the differences in the transmit path and receive path accounting for all the antenna/radios used in MIMO operation, wherein the correction factor is expressed by $\rho_{ij}$, which is the weight ratio of antenna to antenna j for the channel reciprocity level.

9. The method of claim 7, wherein computing the correction factor for the channel reciprocity level further comprises:
performing the following for a calibrated antenna/radio and un-calibrated antenna/radio pair:
selecting a calibrated and un-calibrated antenna/radio pair to perform the self-calibration procedure after completing the self-calibration for the first pair; and
repeating the self-calibration procedure until all the antennas/radios to be used for MIMO operations are calibrated.

10. The method of claim 7, wherein computing the correction factor for the channel reciprocity level further comprises:
determining the correction factor for the channel reciprocity level obtained with calibration data for antenna/radio elements i and j, wherein said correction factor is expressed by $\rho_{ij}=(R_{a\_ji}*R_{c\_ji}*R_{b\_ij})/(R_{b\_ji}*R_{a\_ij}*R_{c\_ij})$.

11. The method of claim 7, wherein performing the self-calibration procedure further comprises:
presetting a timer using a processor or other baseband logic to repeat the self-calibration procedure for all the antennas/radios to be used for MIMO operation by recomputing and updating the correction factors for the channel reciprocity level.

12. The method of claim 7, wherein performing the self-calibration procedure is based on meeting a predefined threshold of a changing condition by:
presetting a processor or other baseband logic to recompute and update the correction factor for the channel reciprocity level when said threshold is met; and
repeating the self-calibration procedure for all the antennas/radios to be used for MIMO operation.

* * * * *